July 2, 1963
G. P. DAVIS
3,096,211
ALKALI METAL GENERATORS
Filed March 28, 1960
HEATING FILAMENT
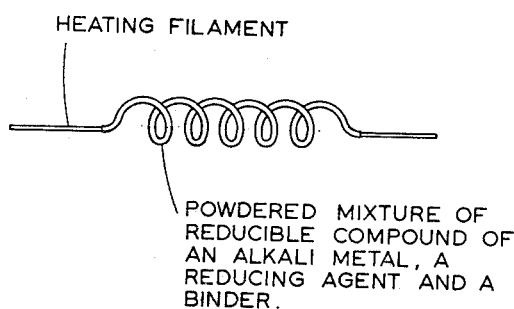
POWDERED MIXTURE OF REDUCIBLE COMPOUND OF AN ALKALI METAL, A REDUCING AGENT AND A BINDER.
Inventor
G. P. Davis
By Mascot Downing Seebold
Attys.

United States Patent Office 3,096,211
Patented July 2, 1963

3,096,211
ALKALI METAL GENERATORS
Gordon Peter Davis, Sunbury-on-Thames, England, assignor to Electric & Musical Industries Limited, Hayes, England, a company of Great Britain
Filed Mar. 28, 1960, Ser. No. 18,145
Claims priority, application Great Britain Mar. 31, 1959
8 Claims. (Cl. 117—224)

This invention relates to alkali metal generators.

In the manufacture of various kinds of photo-electric and other devices it is frequently necessary to deposit a layer of an alkali metal. For example in the manufacture of a photo-electron emissive surface one or more of the alkali metals may be used to activate a base layer such as antimony, silver or some other suitable metal. Usually the alkali metals are produced by the reduction of salts of the alkali metals by an exothermic reaction which may be caused to occur within the envelope of a device in which the photo-emissive surface is required to be formed. The reaction may be initiated by passing an electric current through a closed metal tube or capsule containing a finely divided mixture of aluminium powder, tungsten powder and the chromate of the alkali metal. The aluminium constitutes a reducing agent whilst the tungsten is employed as a moderator or decelerator to the reaction. In the use of such tubes or capsules, when sufficient alkali metal has been produced, the flow of electric current is stopped and the heat capacity of the metal container is usually sufficient to arrest the reaction.

The object of the present invention is to provide an improved alkali metal generator and according to the invention an alkali metal generator is provided comprising an electrically conducting heating element of filamentary form a coating thereon comprising, a powdered mixture of a reducible compound of an alkali metal, and a reducing agent for said compound and an alkali metal silicate.

The alkali metal silicate has a low vapour pressure and does not flake when the heating element is heated to generate alkali metal vapour, does not leave a residue which would be liable to fall away from the heating element after heating and at the temperature of evolution of the alkali metal does not allow the mixture to fall away from the heating element. Preferably the alkali metal silicate is of the same alkali metal which it is required to generate. Tungsten powder may be employed in the generator as a moderator or decelerator although, the alkali metal silicate of the invention itself acts as a moderator or decelerator so that the use of tungsten powder for this purpose as has heretofore been employed can be avoided.

In order that the said invention may be clearly understood and readily carried into effect, one embodiment thereof will now be described.

The generator according to the invention comprises an electrically conducting heating element which may be of any suitable filamentary form and may for example comprise a coil formed by winding tungsten wire having a diameter of 0.006" onto a mandrel having a diameter of 0.0625" with the turns spaced approximately 30 to the inch. The length of the coil will depend on the use for which the generator is required. A finely powdered mixture capable of passing a sieve having 160 apertures per linear inch of one part by weight of aluminium and one part by weight of the chromate of an alkali metal such as caesium chromate is mixed into a paste with a solution of an alkali metal silicate. The coil aforesaid may be dipped into the paste so that the mix is carried inside the coil. Alternatively the paste may be coated onto a heating element in the form of a strip of metal or a length of wire. After drying, the generator may be mounted in the envelope of a device in which a layer of alkali metal is required to be formed and may be arranged for example to face the end window of a pick-up tube or photo-electric cell in which a photo-emissive cathode is required to be formed. Any gases contained in the generator may be released in vacuo by passing a current of about 1.5 amperes through a coiled heating element of the dimensions aforesaid.

The caesium can be released from the generator by passing a current through the coil of about 2 amperes.

The alkali metal silicate employed may be the silicate of a different metal from that required to be generated. For example potassium or sodium silicate may be employed with caesium chromate. It is however preferred to employ the silicate of the alkali metal which is required to be generated. Thus for example where the alkali metal required is caesium, caesium silicate is used as the binder or where sodium is required to be generated sodium silicate is employed, or where potassium is required to be generated potassium silicate is employed. When sodium or caesium silicate is employed the coated heating element may be heated in air for 30 minutes at 80° C. to remove water vapour and when potassium silicate is employed the coated heating element may be dried in air at room temperature. The specific gravity of the silicate is 1.33.

Tungsten powder may be employed in the generator as aforesaid and where such powder is employed the mix may comprise by weight one part of alkali metal chromate, one part of aluminium powder and twelve parts of tungsten powder. In the present invention, the use of an alkali silicate acts as a binder and also functions as a moderator or decelerator for the reaction, and therefor the tungsten powder can if desired be entirely omitted from the mix.

It is found with a generator in accordance with the invention that the current required to initiate the reaction is constant to within ±0.1 ampere and a reduction in current of 0.25 ampere is sufficient to stop the reaction.

Instead of using aluminium as a reducing agent silicon in powdered form may be used. In this case also tungsten powder may be omitted. Also instead of using the chromates of the alkali metals other reducible compounds of said metals such as the bromide of the alkali metals in which latter case calcium would be employed as the reducing agent.

The accompanying drawing illustrates a typical generator according to the invention.

What I claim is:

1. An alkali metal generator comprising an electrically conducting heating element of filamentary form, a coating thereon comprising a powdered mixture of a reducible compound of an alkali metal and a reducing agent for said compound and an alkali metal silicate.

2. An alkali metal generator according to claim 1, wherein said reducing agent comprising powdered aluminium.

3. An alkali metal generator according to claim 1, wherein said reducible compound of alkali metal and said reducing agent are employed in equal proportions by weight.

4. An alkali metal generator according to claim 1, wherein said coating includes tungsten powder.

5. An alkali metal generator comprising an electrically conducting heating element of filamentary form, a coating thereon comprising a powdered mixture of a reducible compound of an alkali metal and a reducing agent for said compound and a silicate of the same alkali metal as the alkali metal of said compound.

6. An alkali metal generator comprising an electrically conducting heating element of filamentary form, a coating thereon comprising a powdered mixture of a chromate of 7. A generator for generating caesium vapor comprising an electrically conducting heating element of filamentary form, a coating thereon comprising a powdered mixture of a caesium compound and a reducing agent therefor, and an alkali metal silicate.

8. An alkali metal generator comprising a filamentary multi-turn helical conducting heating element, a coating thereon comprising a powdered mixture of a reducible compound of an alkali metal and a reducing agent therefor and an alkali metal silicate.

References Cited in the file of this patent

UNITED STATES PATENTS

| | | |
|---|---|---|
| 1,831,314 | McMaster et al. | Nov. 10, 1931 |
| 2,040,571 | Selenyl | May 12, 1936 |
| 2,154,131 | Lederer | April 11, 1939 |
| 2,160,593 | Kling | May 30, 1939 |
| 2,173,259 | Lederer | Sept. 19, 1939 |
| 2,462,245 | Wooten | Feb. 22, 1949 |
| 2,504,764 | Vollrath | April 18, 1950 |
| 2,650,975 | Dorst | Sept. 1, 1953 |
| 2,771,565 | Bryant et al. | Nov. 20, 1956 |
| 2,830,917 | Kern | April 15, 1958 |